(12) United States Patent
Li

(10) Patent No.: US 10,205,362 B2
(45) Date of Patent: Feb. 12, 2019

(54) DOUBLE-INSULATED MOTOR AND PINION DEVICE

(71) Applicant: CHANGZHOU GLOBE CO., LTD., Changzhou, Jiangsu (CN)

(72) Inventor: Jianbo Li, Jiangsu (CN)

(73) Assignee: CHANGZHOU GLOBE CO., LTD., Changzhou (CN)

( * ) Notice: Subject to any disclaimer, the term of this patent is extended or adjusted under 35 U.S.C. 154(b) by 36 days.

(21) Appl. No.: 15/493,168

(22) Filed: Apr. 21, 2017

(65) Prior Publication Data

US 2017/0222510 A1 Aug. 3, 2017

Related U.S. Application Data

(63) Continuation of application No. PCT/CN2015/084523, filed on Jul. 20, 2015.

(30) Foreign Application Priority Data

Oct. 23, 2014 (CN) ............. 2014 2 0615823 U

(51) Int. Cl.
*H02K 7/116* (2006.01)
*H02K 3/32* (2006.01)
*A01D 34/78* (2006.01)
*H02K 5/08* (2006.01)
*H02K 7/00* (2006.01)
(Continued)

(52) U.S. Cl.
CPC .............. *H02K 3/32* (2013.01); *A01D 34/78* (2013.01); *H02K 5/08* (2013.01); *H02K 7/003* (2013.01); *H02K 7/116* (2013.01); *H02K 5/173* (2013.01); *H02K 7/08* (2013.01); *Y02T 10/641* (2013.01)

(58) Field of Classification Search
CPC ...................................................... H02K 7/116
See application file for complete search history.

(56) References Cited

U.S. PATENT DOCUMENTS 3,959,990 A * 6/1976 Golitz ................... F16H 57/025
464/137
4,690,010 A * 9/1987 Matsumoto .............. B25J 9/102
310/83
(Continued)

FOREIGN PATENT DOCUMENTS

CN 102105676 A 6/2011
CN 203722374 U 7/2014

OTHER PUBLICATIONS

International Search Report of PCT Patent Application No. PCT/CN2015/084523 dated Sep. 30, 2015.

*Primary Examiner* — Dang D Le

(57) ABSTRACT

A double-insulated motor and pinion device including a motor, motor-fixing seat, pinion, pinion sleeve and double insulation sleeve. The motor and motor-fixing seat are connected together to form a motor assembly. The pinion is mounted on a motor shaft. The pinion sleeve is mounted under the pinion, and the double insulation sleeve is connected under the pinion sleeve. The pinion, pinion sleeve, and double insulation sleeve are mounted together to form a pinion assembly. The pinion assembly is mounted on the motor assembly. It can solve the requirement of basic insulation and reinforced insulation of a series of high voltage direct current products by adding two insulation parts, while reducing space and lowering cost.

3 Claims, 2 Drawing Sheets

(51) Int. Cl.
H02K 5/173 (2006.01)
H02K 7/08 (2006.01)

(56) References Cited

U.S. PATENT DOCUMENTS 4,800,766 A * 1/1989 Isozumi ............... F02N 15/046
310/83
4,955,791 A * 9/1990 Wrobel ............... F04D 29/056
310/67 R

* cited by examiner

DOUBLE-INSULATED MOTOR AND PINION DEVICE

CROSS REFERENCE TO RELATED APPLICATIONS

The present application is a Continuation Application of PCT application No. PCT/CN2015/084523 filed on Jul. 20, 2015, which claims the benefit of Chinese Utility Model Application No. 201420615823.0 filed on Oct. 23, 2014. All the above are hereby incorporated by reference.

FIELD OF THE TECHNOLOGY

The present application relates to the field of garden tool technology, and in particular to a double-insulated motor and pinion device.

BACKGROUND

Green vegetation is an essential environment element of mankind. Green vegetation is everywhere whether it is in football field, manor, villa courtyard, or ordinary residential area. It brings vitality to people's life. However, in absence of people's care, there exists difference in growing of the green vegetation under natural environment. Over a period of time, the green vegetation will become uneven, messy, and give people a bad visual feeling. It also causes changes in soil composition, and affects ecological balance.

Therefore, application of garden power tools, such as lawn mowers, can prune the football field, manor and other green vegetations to ensure visual aesthetics and ecological balance.

At present, garden power tools that use high voltage and small direct current motors are often subject to space and cost constraints. The result is that the motor and transmission parts cannot simultaneously achieve basic insulation and reinforced insulation.

SUMMARY

The technical problem to be solved in the present application is to provide a double-insulated motor and pinion device, which can solve the requirement of both basic insulation and reinforced insulation of a series of high voltage direct current products by adding two insulation parts, while reducing space and lowering cost.

To solve the above-mentioned technical problem, the technical solution is to provide a double-insulated motor and pinion device including a motor, a motor-fixing seat, a pinion, a pinion sleeve and a double insulation sleeve, the motor and the motor-fixing seat being mounted and connected together to form a motor assembly, the pinion being mounted on a motor shaft, the pinion sleeve being mounted under the pinion, the double insulation sleeve being connected under the pinion sleeve, wherein the pinion, the pinion sleeve and the double insulation sleeve are mounted together to form a pinion assembly, the pinion assembly being mounted on the motor assembly.

In a preferred embodiment, the device also includes a motor shaft flywheel and a bearing, the motor shaft flywheel being mounted on the pinion assembly, the bearing being mounted on the motor assembly, and the pinion assembly being fixedly mounted on the motor assembly by means of the motor shaft flywheel and the bearing.

In a preferred embodiment, the motor-fixing seat is an insulation type motor-fixing seat.

In a preferred embodiment, the double insulation sleeve is a plastic double insulation sleeve, and the motor-fixing seat is a plastic motor-fixing seat.

The beneficial effects of the double-insulated motor and pinion device of the present application is that it can solve the requirement of basic insulation and reinforced insulation of a series of the high voltage direct current products by adding two insulation parts, while reducing space and lowering cost.

BRIEF DESCRIPTION OF THE DRAWINGS

In order to more clearly illustrate the technical solution provided by the embodiments of the double-insulated motor and pinion device of the present application, the drawings to be used in the description of the embodiments will be briefly described below. It will be apparent that the drawings mentioned in the following description are merely some implementations of the double-insulated motor and pinion device. Without making any creative effort, a person skilled in the art may derive other drawings from the drawings in the present application, wherein.

Figure 1:
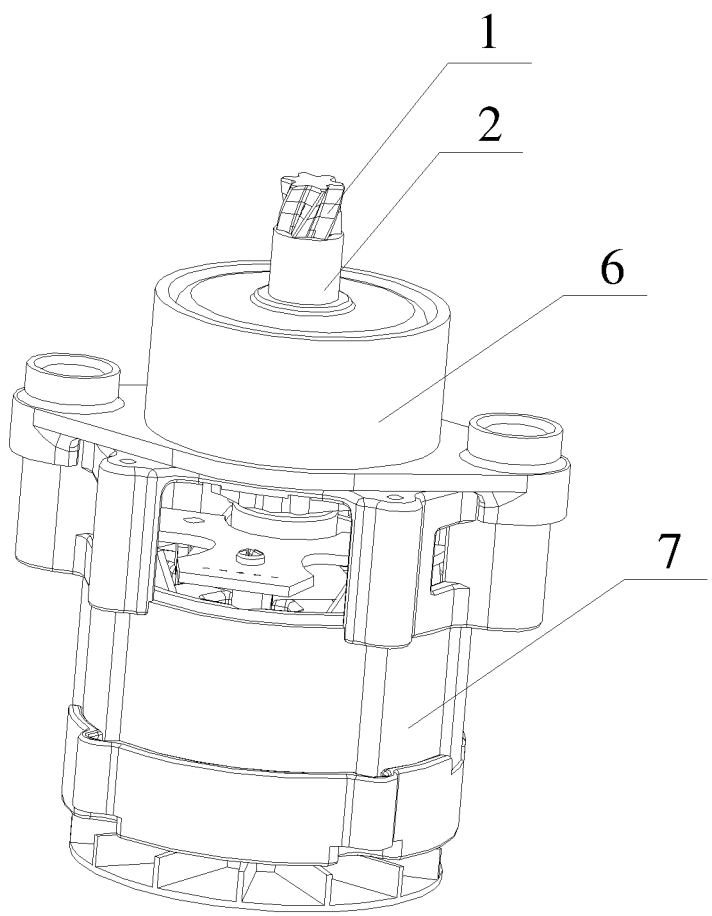
FIG. 1 is a schematic view of a preferred embodiment of a double-insulated motor and pinion device of the present application and FIG. 2 is an exploded view of the double-insulated motor and pinion device in FIG. 1.

The reference numerals in the drawings and their designating parts are as follows: 1—pinion, 2—pinion sleeve, 3—double insulation sleeve, 4—motor shaft flywheel 5—bearing, 6—motor-fixing seat, 7—motor.

DETAILED DESCRIPTION

The technical solution provided by the embodiments of the double-insulated motor and pinion device of the present application will be described clearly and completely below. It is apparent that the described embodiments are only some embodiments of the double-insulated motor and pinion device, and not all of the embodiments. All other embodiments obtained by an ordinary technical person skilled in the art, without making any creative effort, are within the scope of protection of the double-insulated motor and pinion device of the present application.

Figure 2:
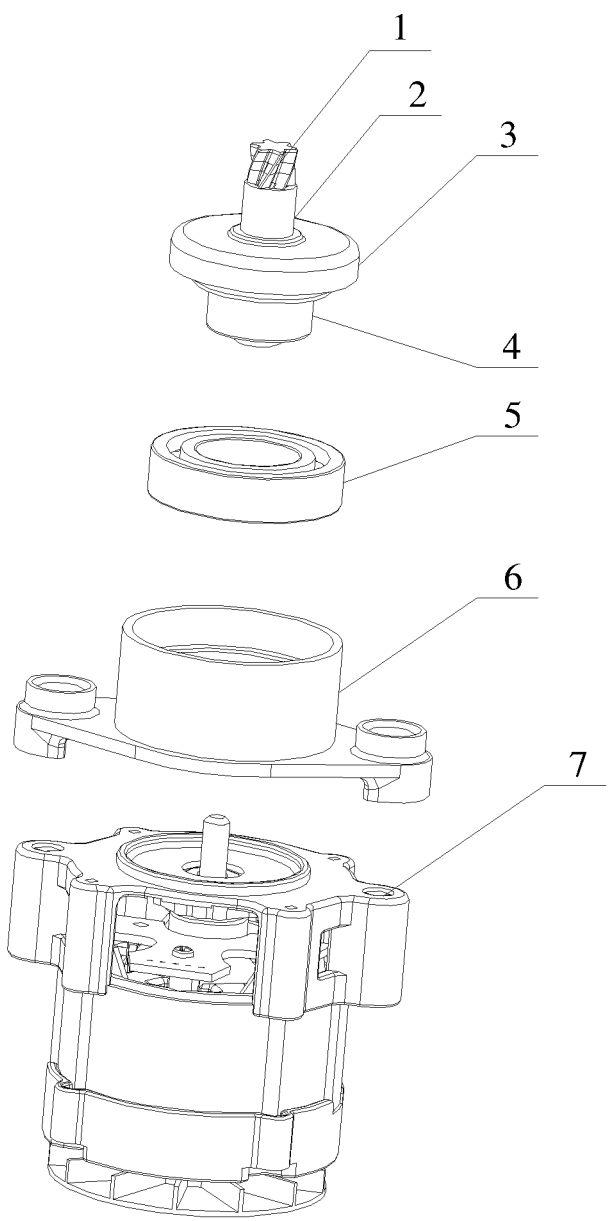

Referring to FIGS. 1 and 2, an embodiment of the double-insulated motor and pinion device may include a motor 7, a motor-fixing seat 6, a pinion 1, a pinion sleeve 2, a double insulation sleeve 3, a motor shaft flywheel 4, and a bearing 5. The motor 7 and the motor-fixing seat 6 can be mounted and connected together to form a motor assembly.

The pinion 1 may be mounted on a motor shaft. The pinion sleeve 2 may be mounted under the pinion 1. The double insulation sleeve 3 may be connected under the pinion sleeve 2. The pinion 1, the pinion sleeve 2, and the double insulation sleeve 3 may be mounted together to form a pinion assembly. The pinion assembly may be mounted on the motor assembly.

The motor shaft flywheel 4 can be mounted on the pinion assembly, and the bearing 5 can be mounted on the motor assembly. Hence, the pinion assembly can be fixedly mounted on the motor assembly by means of the motor shaft flywheel 4 and the bearing 5.

In motor assembly, the motor-fixing seat 6 can be an insulation type motor-fixing seat. It may be made of a plastic piece or a similar insulation piece.

In the pinion assembly, the double insulation sleeve 3 can be a plastic double insulation sleeve, which may also be made of a plastic piece or a similar insulation piece.

In the present embodiment, those insulation parts can be made a plastic piece or a similar insulation piece. This can reduce the manufacturing cost.

The motor-fixing seat 6 and the double insulation sleeve 3 can both be made of an insulation material. This can ensure both basic insulation and reinforced insulation of the entire motor and pinion device. At the same time, it can also be used in a series of high voltage direct current products such as electric direct current garden tools.

The beneficial effect of the double-insulated an device of the present application is that, through the addition of insulation parts, it can solve the requirement of basic insulation and reinforced insulation of a series of high voltage direct current products, while reducing space and lowering cost.

The above-mentioned embodiments are merely some embodiments of the double-insulated motor and pinion device of the present application, and the scope of patent protection is not limited to these embodiments. Any equivalent structures or equivalent changes in process using the contents of the present patent specification, or any direct/indirect application in other related field of technology are within the scope of patent protection of the present application.

What is claimed is:

1. A double-insulated motor and pinion device, comprising:
    a motor, a motor-fixing seat, a pinion, a pinion sleeve and a double insulation sleeve, the motor and the motor-fixing seat being mounted and connected together to form a motor assembly, the pinion being mounted on a motor shaft, the pinion sleeve being mounted under the pinion, the double insulation sleeve being connected under the pinion sleeve, wherein the pinion, the pinion sleeve and the double insulation sleeve are mounted together to form a pinion assembly, and the pinion assembly is mounted on the motor assembly,
    wherein the motor and pinion device further comprising a motor shaft flywheel and a bearing, the motor shaft flywheel being mounted on the pinion assembly, the bearing being mounted on the motor assembly, and the pinion assembly being fixedly mounted on the motor assembly by means of the motor shaft flywheel and the bearing.

2. The double-insulated motor and pinion device according to claim 1, wherein the motor-fixing seat is an insulation type motor-fixing seat.

3. The double-insulated motor and pinion device according to claim 2, wherein the double insulation sleeve is a plastic double insulation sleeve, and the motor-fixing seat is a plastic motor-fixing seat.

\* \* \* \* \*